United States Patent
Baker et al.

(10) Patent No.: US 12,423,033 B2
(45) Date of Patent: *Sep. 23, 2025

(54) METHOD AND SYSTEM FOR PRINTING VERIFIED A NON-FUNGIBLE TOKEN

(71) Applicant: Xerox Corporation, Norwalk, CT (US)

(72) Inventors: John P. Baker, Rochester, NY (US); Robert J. Zhang, Pittsford, NY (US); Elena Kern, Farmington, NY (US); Megan Zielenski, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,972

(22) Filed: May 9, 2024

(65) Prior Publication Data

US 2024/0289069 A1 Aug. 29, 2024

Related U.S. Application Data

(63) Continuation of application No. 17/651,934, filed on Feb. 22, 2022, now Pat. No. 12,067,308.

(51) Int. Cl.
*G06F 3/12* (2006.01)
(52) U.S. Cl.
CPC .......... *G06F 3/1222* (2013.01); *G06F 3/1238* (2013.01); *G06F 3/126* (2013.01)
(58) Field of Classification Search
None
See application file for complete search history.

(56) References Cited

U.S. PATENT DOCUMENTS

| | | |
|---|---|---|
| 9,137,405 B2 | 9/2015 | Eschbach et al. |
| 9,282,215 B2 | 3/2016 | Chapman et al. |

(Continued)

FOREIGN PATENT DOCUMENTS

| | | |
|---|---|---|
| WO | 2018165155 | 9/2018 |
| WO | 2019/141297 | 7/2019 |

OTHER PUBLICATIONS

C. Lakmal, S. Dangalla, C. Herath, C. Wickramarathna, G. Dias and S. Fernando, "IDStack—The common protocol for document verification built on digital signatures," 2017 National Information Technology Conference (NITC), 2017, pp. 96-99, doi: 10.1109/NITC.2017.8285654.

(Continued)

*Primary Examiner* — Thomas D Lee
(74) *Attorney, Agent, or Firm* — Fox Rothschild LLP

(57) ABSTRACT

A system and method for generating a secure digital copy of content associated with a non-fungible token (NFT). The system may include, be part of, or be in communication with a print device. The system will receive, from a requesting entity, a print request to print digital content that is associated with an NFT. The system will then access a user profile of the requesting entity to identify a digital wallet associated with the requesting entity. The system will determine whether the digital wallet indicates that the requesting entity owns the NFT. In response to determining that the digital wallet indicates that the requesting entity owns the NFT, the system will generate a print job that comprises a set of instructions to print the digital content, optionally with a verification code. The system may then cause the print device to print the digital content.

29 Claims, 4 Drawing Sheets

(56) References Cited

U.S. PATENT DOCUMENTS

| | | |
|---|---|---|
| 9,679,276 B1 | 6/2017 | Cuende |
| 9,919,477 B2 | 3/2018 | Levine et al. |
| 9,960,920 B2 | 5/2018 | Cuende et al. |
| 9,961,230 B2 | 5/2018 | Eschbach et al. |
| 10,129,032 B2 | 11/2018 | Vandervort |
| 10,164,952 B2 | 12/2018 | Vandervort |
| 10,237,442 B2 | 3/2019 | Chapman et al. |
| 10,270,600 B2 | 4/2019 | Vandervort |
| 10,425,554 B1 | 9/2019 | Chapman |
| 10,452,964 B1 | 10/2019 | Chapman et al. |
| 10,462,326 B2 | 10/2019 | Chapman |
| 10,812,675 B1 | 10/2020 | Chapman |
| 10,926,471 B2 | 2/2021 | Levine et al. |
| 10,960,698 B2 | 3/2021 | Beabes et al. |
| 11,170,092 B1 | 11/2021 | Liang |
| 11,481,826 B1 | 10/2022 | Karpas et al. |
| 2012/0140287 A1 | 6/2012 | Kawaguchi |
| 2017/0237570 A1 | 8/2017 | Vandervort |
| 2017/0279783 A1 | 9/2017 | Milazzo et al. |
| 2017/0329996 A1 | 11/2017 | Wilson |
| 2019/0384545 A1* | 12/2019 | Dellagnolo ........... G06F 3/1292 |
| 2020/0092106 A1 | 3/2020 | Leong |
| 2021/0132888 A1 | 5/2021 | Yuki et al. |
| 2021/0208822 A1 | 7/2021 | Veenma |
| 2021/0256110 A1 | 8/2021 | Guinard et al. |
| 2022/0222364 A1* | 7/2022 | Roberts ................... G06F 21/64 |
| 2022/0294642 A1 | 9/2022 | Moriya et al. |
| 2022/0309491 A1* | 9/2022 | Shapiro ................... G06F 21/64 |
| 2023/0130182 A1 | 4/2023 | Mir et al. |
| 2023/0353717 A1 | 11/2023 | Ito et al. |

OTHER PUBLICATIONS

Disclosed Anonymously, "Concept for the secure transfer and limitation of 3D print files based on a permissioned blockchain," An IP.com Prior Art Database Technical Disclosure, IP.com No. IPCOM000251141D, Electronic Publication Date: Oct. 17, 2017 (9 pages).

Holland and Stjepandic, "Intellectual Property Protection of 3D Print Supply Chain with Blockchain Technology," 2018 IEEE International Conference on Engineering, Technology and Innovation (ICE/ITMC), pp. 1-8 (2018).

How NFTs are Tracked and Verified, Cyber Scrilla, Feb. 14, 2022, available at https://cyberscrilla.com/how-nfts-are-tracked-and-verified/.

Prints authenticaed by James Moritz, Sep. 17, 2021.

* cited by examiner

METHOD AND SYSTEM FOR PRINTING VERIFIED A NON-FUNGIBLE TOKEN

CROSS-REFERENCES TO RELATED APPLICATIONS

This application is a continuation of U.S. patent application Ser. No. 17/651,934, filed Feb. 22, 2022, the entire contents of which are herein incorporated by reference in their entirety.

BACKGROUND

A non-fungible token (NFT) is a unique set of data stored on a distributed digital ledger. NFTs can hold any form of digital content, such as drawings, animations, videos, photographs and other digital artworks, as well as text, music, videos, documents such as event admission tickets, and other works of authorship. Because an NFT is unique and non-fungible, an NFT allows a creator of digital content to designate one—and only one—copy of the work to be the "original". By storing each NFT on a distributed digital ledger (i.e., a blockchain) along with an identification of the NFT's owner, ownership of each NFT is a verifiable, public record.

Currently, unless the file includes technical countermeasures that prevent printing and copying, anyone can print a copy of a digital content file. However, such countermeasures are not desirable in the field of NFT art, as they would prevent even a purchaser of the NFT from printing the work to view and display. Thus, NFT files typically do not have the digital rights management countermeasures that are used to prevent copying of files that are off the blockchain.

Ownership of physical artwork is easy to verify, as the owner has possession of the physical work. However, there is currently no easy way to verify whether a printed copy of a work of art or other document was printed by an authorized entity, such as the owner of the work's NFT, as there is no difference between a copy printed from the NFT file and a copy printed from another digital file that is not associated with the NFT.

This document describes methods and systems that are directed to solving the issues described above.

SUMMARY

This document discloses various embodiments of a system and method for generating a secure digital copy of content associated with a non-fungible token (NFT). The system will include a processor and a computer-readable medium containing programming instructions that are configured to cause the processor to implement the methods described below. The processor and instructions may be components of a print device, or components of one or more computing devices that are communicatively connected with the print device, either directly or via one or more intermediate communication devices. The system will receive, from a requesting entity, a print request that includes a request to print digital content that is associated with a first NFT. The system will then access a user profile of the requesting entity to identify a digital wallet that is associated with the requesting entity. The system will determine whether the digital wallet indicates that the requesting entity owns the first NFT. In response to determining that the digital wallet indicates that the requesting entity owns the first NFT, the system will generate a print job that comprises a set of instructions to print the digital content. The system will transfer the print job to a print engine of the print device to print the digital content.

In some embodiments, to determine whether the digital wallet indicates that the requesting entity owns the first NFT, the system will submit a search request to a blockchain. The search request will include a transaction hash that is stored in the digital wallet and that seeks to return an identifier of an NFT that is associated with the transaction hash. If so, then to determine whether the digital wallet indicates that the requesting entity owns the first NFT the system, may determine that the digital wallet indicates that the requesting entity owns the first NFT if (i.e., in response to) the identifier for the NFT that is associated with the transaction hash matching an identifier for the first NFT. Alternatively or in addition, to determine whether the digital wallet indicates that the requesting entity owns the first NFT, the system may (a) render content of the NFT that is associated with the transaction hash, (b) compare the rendered content to the digital content of the print request, and (c) in response to the rendered content corresponding to the digital content of the print request, determine that the digital wallet indicates that the requesting entity owns the first NFT.

In some embodiments, when generating the print job the system may generate instructions to cause the print engine to print a verification code with the digital content. The verification code comprises an identifier for the digital wallet, a transaction hash that is stored in the digital wallet, or both. Optionally, the print job may include instructions to print the digital content on a first side of a substrate and print the verification code on a second, opposite side of the substrate. Alternatively, if the print device is a three-dimensional print device, the print job may include instructions to print the digital content as a three-dimensional object, and to either print the verification code on a surface of the three-dimensional object or embed the verification code within the three-dimensional object.

In some embodiments, the system may prompt the requesting entity to submit a payment. If the user submits the payment, the system may generate instructions to print a verification code with the digital content, and the system may transfer the instructions to print the verification code to the print engine. Otherwise, the system may not generate and/or transfer the instructions to print the verification code until payment is received. If the system generates the verification code, the system may also transmit the verification code and an identifier for the NFT or for the digital content to a distributed digital ledger for storage.

In some embodiments, the system may include a print device that includes the print engine. The processor and the computer-readable medium that contains the programming instructions may be components of the print device, components of one or more computing devices is in communication with the print device, or both.

In some embodiments, the instructions to generate the print job may include instructions to extract the digital content from the NFT and use the data to generate a queueable print system object that represents the digital content and that includes instructions for rendering the digital content on the print device.

In some embodiments, the instructions to generate the print job may include instructions to extract, from the NFT, an address for a server. The system may then query the server for the digital content. Upon receipt of the digital content from the server, the system may generate a queueable print system object that represents the digital content and that includes instructions for rendering the digital content on the print device.

In some embodiments, where the NFT contains a rule requiring payment of a fee for printing a verified copy of the digital content, the system may wait and only transfer the print job to the print device until after the system has received confirmation of payment of the fee.

Optionally, the system may include a server and instructions to store the print job on the server. The system also may be configured to cause the server to transfer the print job to an additional print engine upon presentation of an authentication credential, payment, or both from an additional requesting entity.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

As described above, a non-fungible token (NFT) is a unique set of data stored in a distributed digital ledger. The data included in an NFT can be any work of authorship, including but not limited to digital artwork such as graphic art, a photograph, a three-dimensional (3D) model, a GIF or a video, in-game items and other digital assets purchased for use in a videogame or other virtual platform, or unique documents such as event admission tickets, deeds and other legal documents. Each NFT is stored on a public, distributed digital ledger (i.e., a blockchain) and includes an identification of the NFT's owner. At the time of this writing most NFTs are part of the Ethereum blockchain, but this disclosure is not limited to that particular platform.

Figure 1:
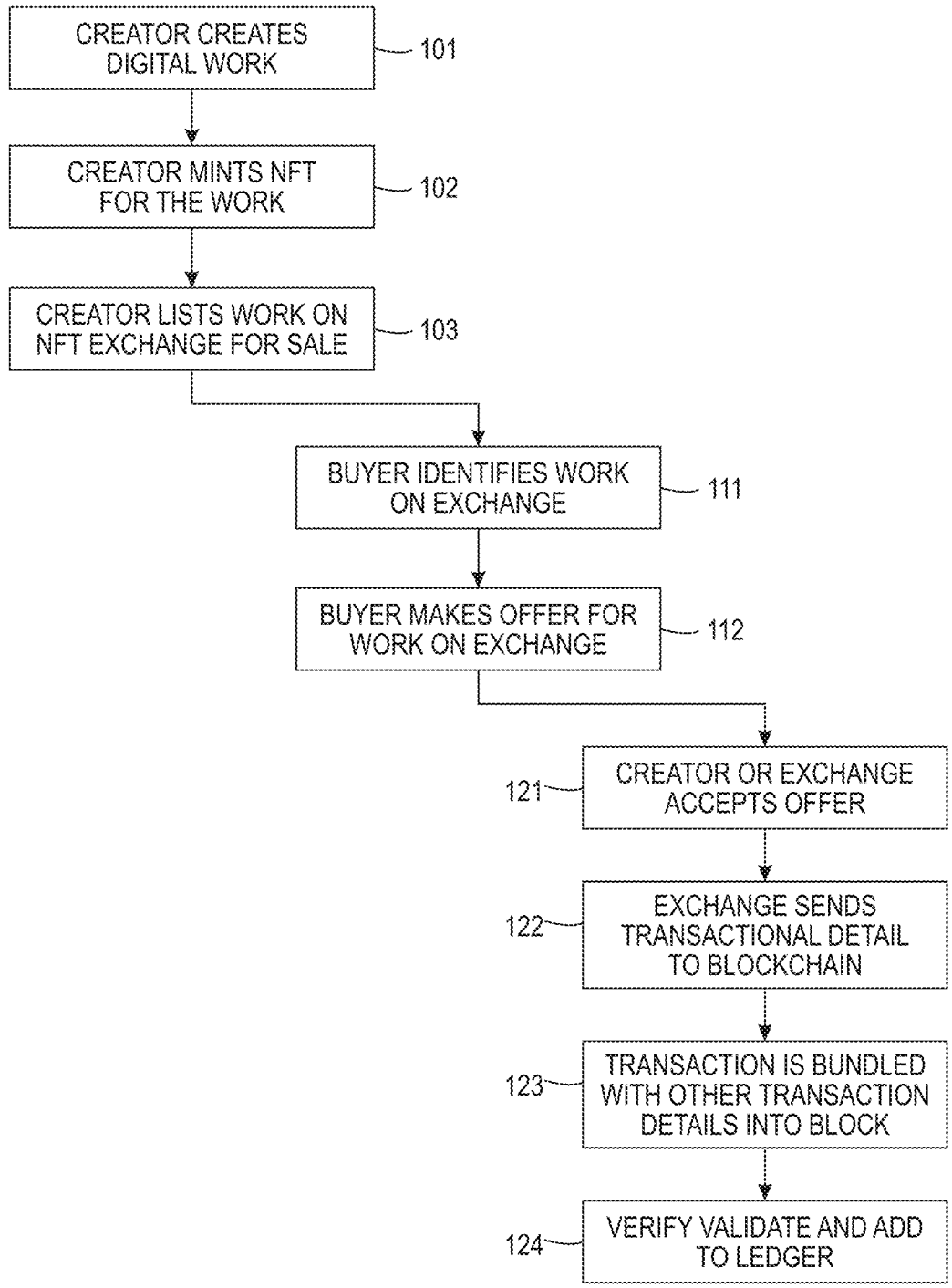
FIG. 1 illustrates a process of creating and transferring ownership of a non-fungible token (NFT) as is known in the prior art.

FIG. 1 illustrates a process of creating and transferring ownership of an NFT as is known in the prior art. At 101 an artist, photographer, writer, or other creator creates a digital work such as artwork; a collection of photos or drawings; a book, article or poem; a work of authorship; or another document or object as described above. The digital work will be stored in one or more digital files that a computer application such as a word processor, a photo or publishing application, a browser or another application may access and process for display, printing or other use on a computing device.

At 102 the creator mints an NFT for the work for use with a blockchain platform such as the Ethereum, EOS, Solana, or Binance Smart Chain platforms. To mint an NFT, the creator must first create a digital wallet (or designate an existing digital wallet) that is compatible with the blockchain platform's token standard for NFTs. The creator must also have a user account on an NFT exchange, which is an online marketplace where buyers and sellers can exchange digital items. Commonly-used NFT exchanges at the time of this writing include those known as OpenSea, Rarible, Mintable and Makerspace. The NFT exchange's user interface will include a workflow that the creator (or a representative of the creator) must follow to mint an NFT for a work. For example, the workflow may require the creator to upload the digital content file (or files) for the work to the marketplace. Alternatively, the workflow may permit the creator to designate an address of a server at which the digital content is hosted. The exchange also may require the creator to associate a name and/or description with the content, and the workflow may offer the user the opportunity to associate one or more traits or attributes with the file (such as a password or other alphanumeric trait, and/or unlockable content that can only be viewed by the purchaser). Once the information submission process complete, the exchange will require the creator to sign a message in their digital wallet. When the digital signature is provided, the NFT is created and is associated with the creator's digital wallet, because the creator is the owner of the NFT at the time of the NFT's creation.

Once the NFT is created, at 103 the creator may list the NFT for sale on the marketplace by identifying terms of sale such as an auction sale with minimum bid, a fixed price, or other terms such as a requirement that the creator receive a royalty upon any resale of the NFT to another entity in the future.

After the NFT is listed on the online marketplace, at 111 a buyer can view the NFT's associated work on the exchange, and at 112 the buyer may submit to the exchange an offer to purchase the NFT. At 121 the exchange and/or the creator examines the offer and determines whether the to accept the offer. For example, if the terms provide for terms of sale such a fixed price, and if the buyer's offer is the first offer to satisfy the terms, then the exchange or the creator may accept the buyer's offer at 121. However, if the terms include an auction, the exchange and/or the creator may examine all offers received during a period of time of the auction and select, from all offers that satisfy the terms of sale, the offer that includes the highest bid.

Upon acceptance of the offer, the exchange will require the buyer to sign a message in the buyer's digital wallet. The exchange transfers ownership of the NFT to the buyer by removing the NFT's association with the creator's digital wallet, associating with the NFT a link to the public key of the buyer's digital wallet, and sending a record of the transaction to the applicable blockchain platform at 122.

At 123 the blockchain platform will bundle the transaction record with one or more other records into a block. When grouping the transaction record into a block, the system may choose a group of records having a total size that is within a target size range. The platform may apply any other set of rules to determine which records to group into a block, such as rules that prioritize certain types of records over others, or rules that will group records having one or more common attributes.

At 124 the blockchain platform will verify the transaction and/or validate the block and, upon verification and verification, add the block to the platform's permanent distributed digital ledger. To validate a transaction (which is a process that the system may do before or after adding the transaction to a block), the system also may check the transaction against various rules. The rules can be kept on centralized servers, while in more distributed systems all nodes that store any part of the blockchain would have a copy of all rules. For example, the rules may require that the system review the existing blockchain and confirm that the seller is the current owner of the NFT. To validate a block, the system may create a proof of work for the block using any of various methods, such as by adding a nonce (a random number) to the block data, then hashing the block data. If the hash fails to meet the requirements of the proof of work, the nonce is changed and a new hash is made. When the system has successfully created a proof of work for a valid block, it sends the solution (the proof of work) to all nodes of the system.

Figure 2:
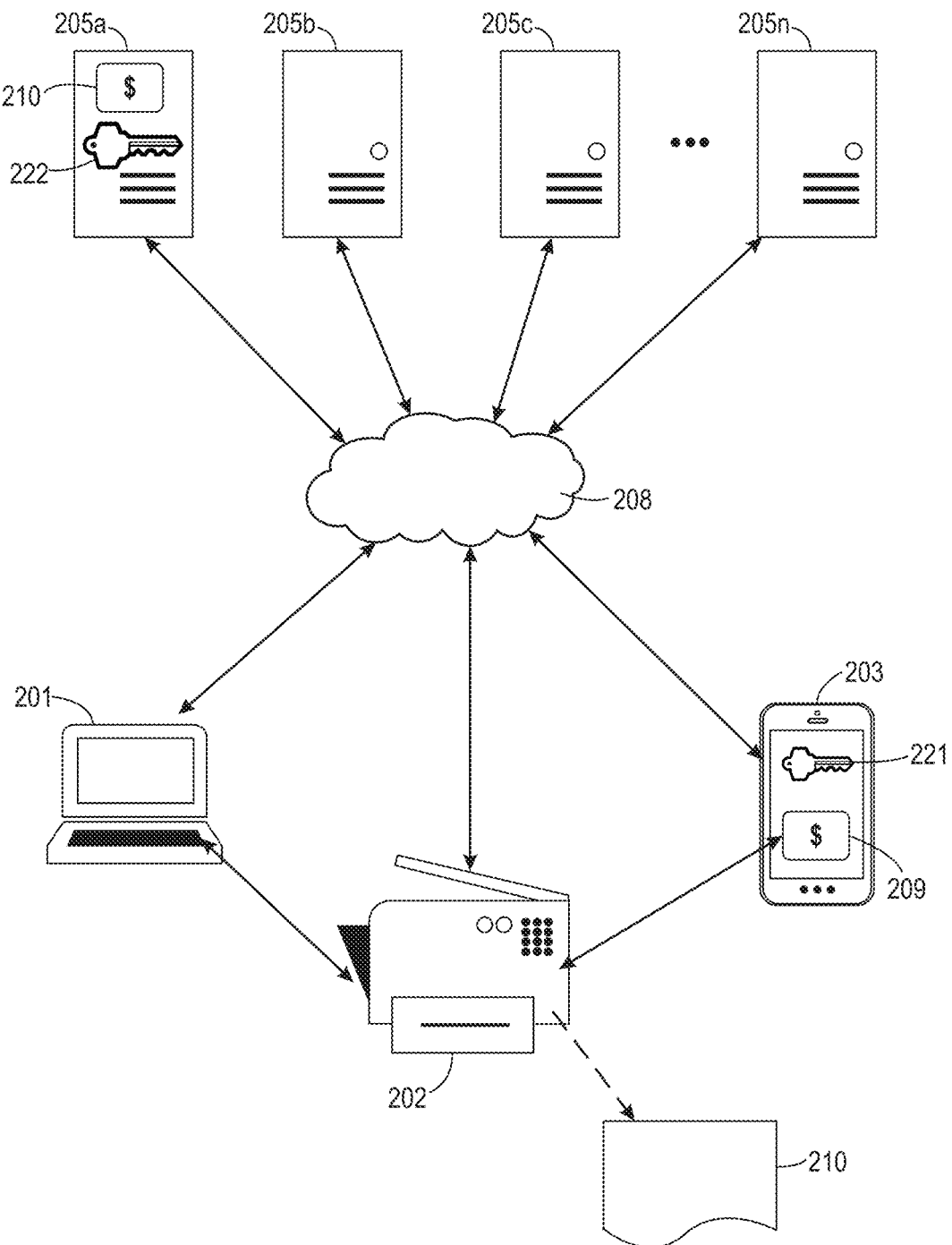
FIG. 2 illustrates a system that may be used to print a verified copy of digital content that is associated with an NFT.

FIG. 2 illustrates a system that may be used to print an authenticated copy of digital content that is associated with an NFT. After an entity has created or acquired NFT art or an NFT for other digital content, that entity may use a system that includes a computing device 201 and/or 203 and a print device 202 to print a verified copy of the content. The computing device 201 may be integrated within the print device 202, or the computing device and print device may be separate devices that are able to transfer messages and communicate with each other via a direct communication link (such one using Bluetooth or another near-field or short-range communication protocol) or via an indirect link through one or more other devices and/or communication networks 208 such as a Wi-Fi network, local area network, cellular communication network and/or the Internet. The computing device 201, print device 202 or both may be devices located in a home of the user, in an office environment, or in a print kiosk arrangement such as may be found in a retail store, hotel, airport or other public location.

The print device 202 will then execute a print job to print the digital content as a tangible printed object 210. For example, if the print device is configured to print two-dimensional (2D) images on a substrate, the object may be a document of any number of pages, a photograph or set of photographs, a finished object such as a book or pamphlet, or a substrate that is a surface of a three-dimensional (3D) object if the print device is a direct-to-object printer. If the print device 202 is a 3D printer, it will print the printed object 210 as multiple layers of build material that the device extrudes onto a print bed. When printing verification codes (as will be described below), a 2D printer may print the verification code on either side of the substrate or object surface. A 3D printer may print the verification code on the surface of the object, or it may embed the verification code within the object using embedded data printing processes such as those described in U.S. Pat. Nos. 9,919,477 and 10,926,471, each of which are issued to Levine et al.

The system will include or have access to any number of servers 205a . . . 205n that collectively store a distributed digital ledger, such as the Ethereum blockchain. Each server 205a . . . 205n will be a node that stores all or a portion of the blockchain, and the blockchain's elements will be replicated to each of the nodes. Each server may be any electronic device containing a computer-readable memory on which data may be stored, along with a communication device that can transmit data to and receive data from other devices. The first computing device 201, the second computing device 202, and/or the print device may communicate with the servers 205a . . . 205n of the blockchain platform via one or more communication networks 208. Optionally, either or both of the computing devices 201, 203 and/or the print device 202 may serve as nodes of the blockchain platform.

Any of the computing devices (such as computing device 203) may store a digital wallet 209, which is a software application that contains a public key 221, and which is associated with a private key 222 that may be stored in the wallet (if the wallet is a non-custodial wallet) or (in the case of a custodial wallet) on a remote server (such as server 205a). Each key is a string of letters and numbers that is unique to the authorized user of the digital wallet. Optionally, instead of being stored on the computing device 203, the digital wallet may be a web wallet 210 that is stored on a remote server 205a that is accessed by a software application (such as a browser) running on the computing device 203. (This document will use the term digital wallet generally to refer to both local digital wallets installed on a client device as well as web wallets.) The digital wallet 203 will have a wallet address, which is a unique string of letters and/or numbers that is the address from and to which the wallet sends and received digital objects such as cryptocurrency and NFTs. The digital wallet's public key and address may be shared with third party for the purpose of engaging in transactions. However, the digital wallet's private key will be encrypted and will not be shared with third parties other than (if used) the wallet custodian (such as that which operates server 205a).

Figure 3:
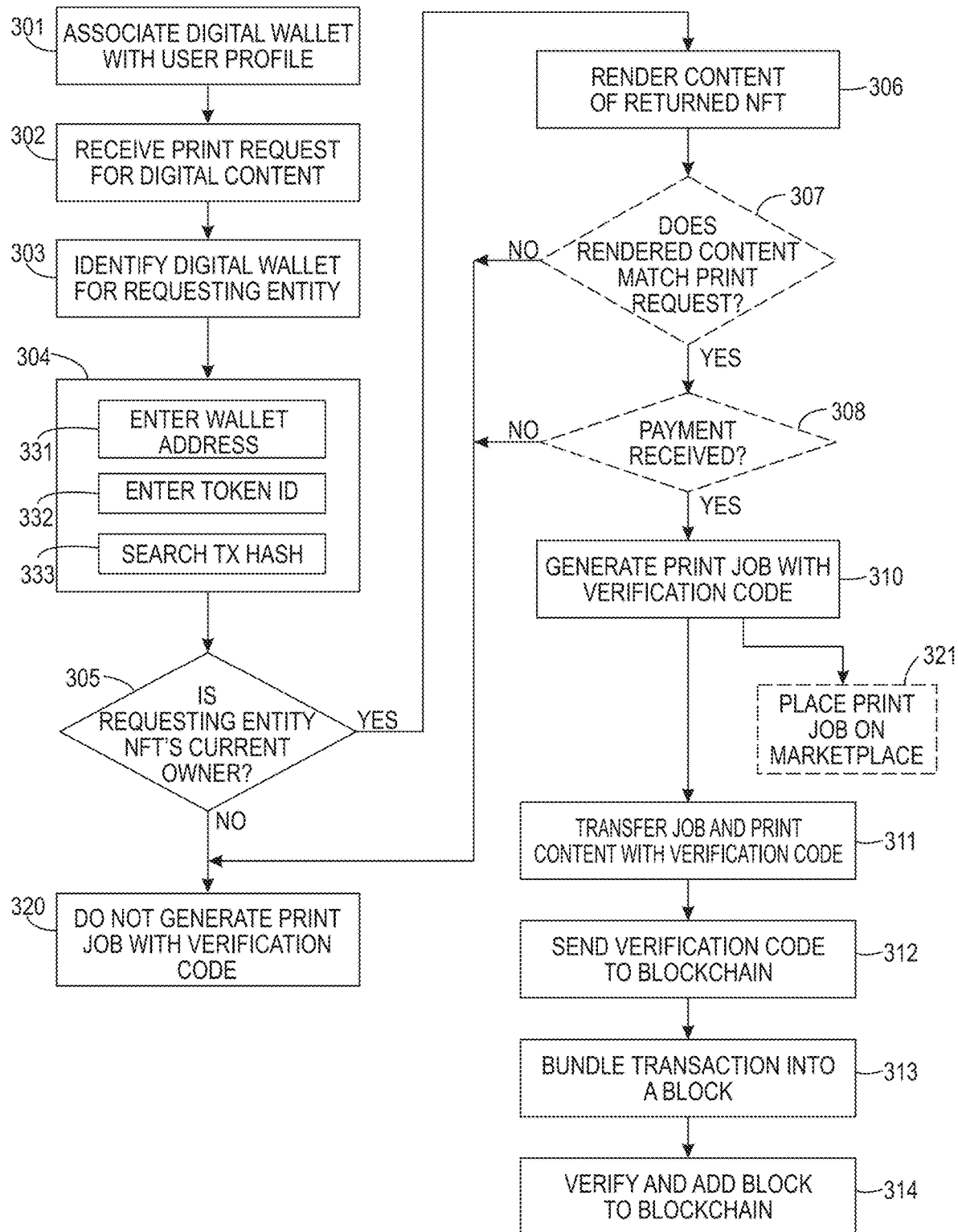
FIG. 3 illustrates a process for printing a verified copy of an NFT work and creating a record of the print.

FIG. 3 illustrates a process by which a system such as that shown in FIG. 2 may generate and print a verified copy of content associated with an NFT. This system will include a data store of user profiles for authorized users of a print service. The data store may be located in a memory of one or more of the remote servers (e.g., server 205n of FIG. 2), or it may be stored in a memory of a print device or in memory of a computing device that is communicatively connected to a print device (e.g., print device 202 and computing device 201 of FIG. 2). As an optional step prior to the process, at 301 an authorized print service user who has purchased an NFT will instruct the system to associate the user's digital wallet with the user's print service user profile. The association of the wallet with the user profile may be done by storing a wallet address, or another identification code for the digital wallet, in the user profile. The digital wallet will be that with which the user purchased the NFT. The digital wallet may store a copy of the NFT. Alternatively, if the NFT is stored remotely on a blockchain the digital wallet will contain a code that can be used to access the NFT on the blockchain, such as a hash of a transaction identification code for the NFT purchase transaction. (Such a hash is commonly known as a "transaction hash" or "TX hash".)

At 302 a computing device will receive a print request from a requesting entity. The print request will include a request to print digital content that is associated with an NFT (which we may refer to as the "first NFT" in this discussion for the purpose of distinguishing it from other NFTs). If the content is two-dimensional (2D) content, the print request may be for a standard print device to print the 2D content on a substrate. If the content is three-dimensional content, the print request may be for a 3D printer to deposit layers of build material to yield a printed 3D object. The print request will include an identifier for the first NFT, as well as an identifier for the requesting entity. The identifier the requesting entity may be part of the request, or the application may require the user to submit an authentication credential. Alternatively, the application may cause the device to separately identify the requesting entity, such as by accessing an identifier for a user who has logged into the device Referring again to FIG. 2, the computing device may be a print device 202 or a separate computing device 201 that is in communication with the print device 202. Either way, the receiving device will run an application (either from its memory, or from a server via a browser or other thin client application) that performs the NFT verification and printing steps described below.

Returning to FIG. 3, at 303 the computing device will identify a digital wallet for the requesting entity. If the print service request includes a wallet address or other identifier for the digital wallet, the computing device may use that identifier to identify the digital wallet. Alternatively, if a digital wallet was associated with the requesting entity's user profile at step 301, the system may examine the requesting entity's user profile and retrieve the wallet identifier from the user profile.

At 304 the computing device will determine whether the digital wallet indicates that the requesting entity owns the first NFT. To do this, the system may simply examine the digital wallet to determine whether a digital file that contains to the NFT is stored in the wallet. However, in many cases NFTs are stored remotely on a blockchain, and digital wallets merely contain a transaction ID (and more typically a transaction hash) for the transaction in which the wallet's owner purchased the NFT. If the digital wallet does not actually contain the NFT digital file, the system may submit a search request to the blockchain at 304, in which the search request includes the transaction hash 333, and optionally also the wallet's address 331 and/or an identifier for the NFT 332. The system may submit this search request to an external blockchain explorer service such as those available at etherscan.io, blockchain.org, or tokenview.com. Other blockchain explorer services may be used without deviating from the scope of the present disclosure.

At 305 the computing device will examine information returned from the blockchain explorer to determine whether the requesting entity's digital wallet indicates that the requesting entity owns the first NFT. If the search request included an identifier for the NFT 332, the result returned from the blockchain explorer may directly indicate whether or not the requesting entity's digital wallet indicates that the requesting entity owns the first NFT. Alternatively, the result may return an identifier for an NFT that is associated with the transaction hash, and if so the system may then compare the returned NFT identifier with an identifier for the first NFT to determine whether the identifiers match. In this alternative case, a match will indicate that the requesting entity owns the first NFT. A non-match may not necessarily confirm that the requesting entity does not own the first NFT, but in the case of a non-match the system will not determine that the requesting entity owns the first NFT absent other information that confirms ownership.

If the system cannot verify that the requesting entity is the first NFT's current owner (305: NO), the system will not generate a print job that includes a verification code, as indicated by box 320 in FIG. 3. The system may or may not print the digital content in this case, but the content will not include the verification code. Processes for generating and printing a verification code will be described below.

On the other hand, if the system does determine that the requesting entity is the first NFT's current owner (305: YES), the system may then render content of the returned NFT at 306, and it may generate a print job that includes a set of instructions to print the content that is associated with the returned NFT at 310. For example, in situations where the returned identifier is that of the first NFT, the system may generate the print job at 310 and transfer the print job to a print device for printing at 311.

When generating the print job at 310 and transferring the print job to the print device at 311, the system may generate and transfer a verification code to be printed with the digital content. The verification code may include any or all of the following information: an identifier for the digital wallet; a transaction hash that is stored in the digital wallet; a transaction hash for a print transaction that resulted in printing of the content; and/or a location at which the print device is located. The system may use any suitable code generation process to generate and format the code. For example, the system may generate a machine identification code (MIC), which is a digital watermark that encodes a unique combination of characters (such as a number and/or letter combination) into a pattern of tiny dots (generally known as microdots) spread over some or all of the print area. Methods of generating a MIC include those developed by Xerox Corporation and are known in the art. The MIC will contain a serial number of the print device, along with a date and time at which the document is printed. With this combination of information, each MIC will be unique, as only one document can be printed by a printer at any given time. Other codes, such as pantograph marks, correlation marks, other types of watermarks, or more visible marks such as barcodes, QR codes and matrix codes, may be employed in various embodiments. The content and code may be printed on the same side of the substrate. Alternatively, the print job may include instructions to print the digital content on a first side of a substrate, and to print the verification code on a second side (i.e., the side that is opposite the first side) of the substrate.

To generate the elements of the print job that include instructions for the print device to print the digital content, if the NFT contains the content data the system may extract that data from the NFT and use the data to generate a queueable print system object that represents the digital content and that includes instructions for using the print device to print the digital content on a substrate. If the NFT does not include the content data but instead includes the address of a server or an indicator of a blockchain where the content is stored, the system may extract the address or other indicator from the NFT, query the server or blockchain for the digital content and, upon receipt of the digital content from the server or blockchain, generate a queueable print system object that represents the digital content and that includes instructions that the print device may use to print the digital content on the substrate.

Optionally, before or after generating the print job, but in any event before printing it, at 307 the system may examine the rendered content from step 306 to determine whether the rendered content matches the digital content of the print request. A "match" in this content does not necessarily need to mean an exact or complete match, but also can include situations in which at least a certain amount of the content, or in which at least certain features of the content, match. For example, to confirm whether the returned NFT matches the first NFT, the system may perform image processing on the rendered content, or the system may look for one or more markers in the rendered content (such as certain characters, images or other features) that it knows are in the digital content of the first NFT.

Optionally, before or after generating the print job, but in any event before printing it, at 308 the system may require the requesting entity to remit indicia of payment for the print job before it will transfer and/or execute the print job, or it may require indicia of payment in order to print a verification code on the printed object. For example, if the print device is part of a commercial print kiosk, a print shop, or another system that requires a user to pay a fee to print a document, the system may require the requesting entity to provide credit card account information, debit card account information, other payment account information, or payment confirmation from a digital wallet before the system will permit the print device to print the document, or before it will include a verification code on the document. In addition, if the NFT includes rules that require payment of a royalty to the content creator, their agent, or another entity such as a publisher for printing authenticated copies, the system may require the user to provide a payment confirmation (such as those described above) before it will allow the user to print a copy that contains the verification code.

If the system cannot confirm that the requesting entity is not the first NFT's current owner (305:NO), if the rendered content does not match the digital content of print request (307: NO), or if payment is not received (308: NO) then at 320 the system may or may not generate a print job to print the content, but in either case it will not include a verification code in the print job (see step 320). The print device may either execute the print job and print the content without the verification code, or the print device may not receive the print job at all.

However, if (and only if) the current owner of the NFT is the requesting entity (302: YES), and optionally also (a) if the returned NFT's content matches the first NFT's content (307: YES) and/or (b) any required payment is received (308: YES), then the system will generate the print job at 310 with directions to print the verification code with the digital content.

After the computing device generates the print job at 310 with directions to print the verification code, and optionally only after confirmation of payment at 308, at 310 the computing device may transfer the print job to the print device, which may then execute the print job and print the content and the code on a substrate. In addition, at 312 the computing device will transmit the verification code and an identifier for the NFT or for the digital content to the blockchain for storage in a block. For example, at 313 the blockchain platform may bundle the transaction record with one or more other records into a block using processes and rules such as those described above in the discussion of FIG. 1. At 314 the blockchain platform will verify the transaction and/or validate the block and, upon verification and verification, add the block to the platform's permanent distributed digital ledger. In some embodiments, the computing device may transmit the verification code and the identifier to the blockchain before the print device prints the content; in other embodiments (such as in embodiments that use a MIC code), the computing device may do so only after the print device has printed the digital content.

Optionally, in some embodiments, instead of or in additional to transferring the print job to the print device, the system may place a copy of the print job on a server (such as a company server or a marketplace) where multiple users may access the print job and print copies of the digital content with the verification code. For example, users who are subscribers to a service, who pay to print verified copies of the content, or who have access control rights that permit printing of the content with the verification code, may access the print job on the server and print the verified copy.

Figure 4:
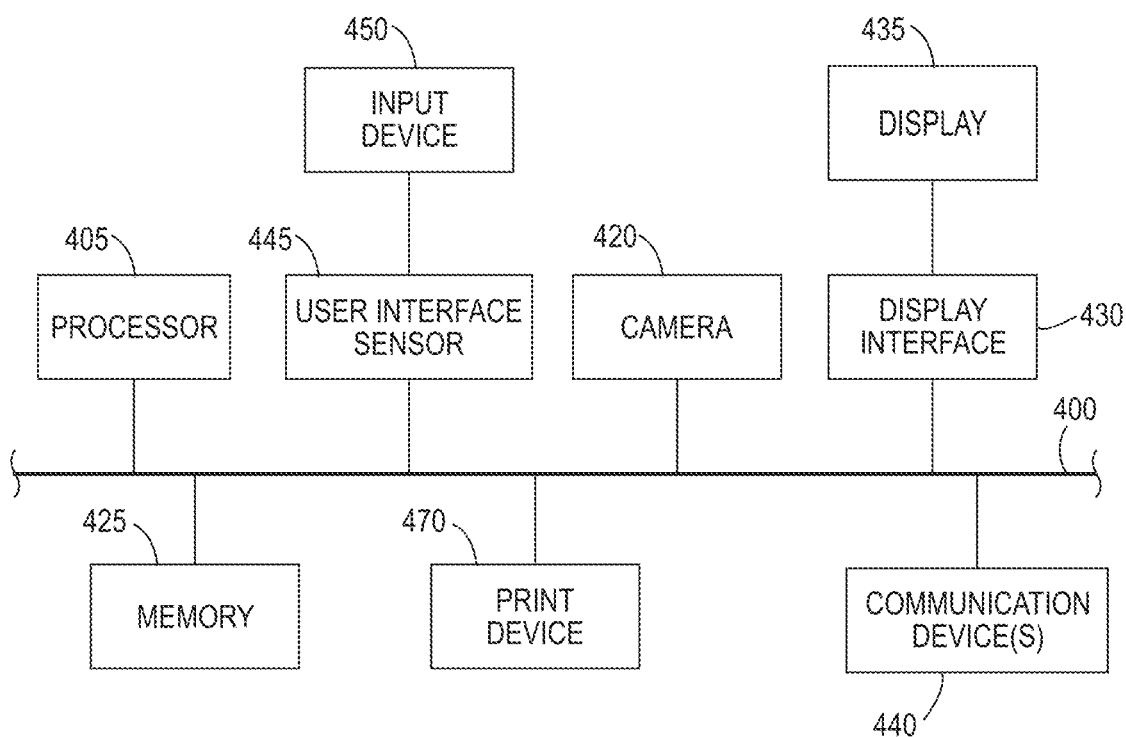
FIG. 4 illustrates example components of computing devices that may implement various embodiments described in this document.

FIG. 4 depicts an example of internal hardware that may be included in any of the electronic components of the system, such as in the print device, in a computing device that a creator uses to create digital content and/or an NFT, or in a computing device that a buyer of an NFT uses to access and print the NFT's associated digital content. One or more conductive busses 400 serve as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 430 may permit information from the bus 400 to be displayed on a display device 435 in visual, graphic or alphanumeric format. An audio interface and audio output (such as a speaker) also may be provided. Communication with external devices may occur using various communication devices 440 such as a wireless antenna, a radio frequency identification (RFID) tag and/or short-range or near-field communication transceiver, each of which may optionally communicatively connect with other components of the device via one or more communication systems. The communication device 440 may be configured to be communicatively connected to a communications network, such as the Internet, a local area network or a cellular telephone data network.

The hardware may also include a user interface sensor 445 that allows for receipt of data from input devices 450 such as a keyboard, a mouse, a joystick, a touchscreen, a touch pad, a remote control, a pointing device and/or microphone. Digital image frames also may be received from a camera 420 that can capture video and/or still images. The system also may include a print device 470 for printing copies of NFT art or other digital content.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the computing device to perform one or more operations according to the programming instructions. Examples of computing devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Computing devices also may include appliances and other devices that can communicate in an Internet-of-things arrangement, such as smart thermostats, refrigerators, connected light bulbs and other devices. Computing devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be a computing device, and each virtual machine or container also may be considered a computing device. In the discussion above, a client device, server device, virtual machine or container may be referred to simply as a "device" for brevity. Additional elements that may be included in computing devices are discussed above in the context of FIG. 4.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the terms "printer" and "print device" refer to a machine having hardware capable of reading a digital document file and using the information from the file and associated print instructions to print a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multi-function device. In embodiments that print a 3D object, the print device may be a 3D printer that can use a digital model to successively place layers of build material on a substrate in a configuration that results in a 3D object.

In this document, the term "print job" refers to a set of instructions that, when executed, will cause a print device to print digital content from one or more digital content files onto a substrate.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for generating a secure digital copy of content associated with a non-fungible token (NFT), the system comprising:
a processor; and
a computer-readable medium containing programming instructions that are configured to instruct the processor to:
receive a print request from a requesting entity, wherein the print request comprises a request to print digital content that is associated with a first NFT,
access a user profile of the requesting entity to identify a digital wallet that is associated with the requesting entity,
determine whether the digital wallet indicates that the requesting entity owns the first NFT,
in response to determining that the digital wallet indicates that the requesting entity owns the first NFT, generate a print job that comprises a set of instructions to print the digital content, and
after receiving indicia of payment, transfer the print job to a print engine to print the digital content.

2. The system of claim 1, wherein the instructions to determine whether the digital wallet indicates that the requesting entity owns the first NFT comprise instructions to:
submit a search request to a blockchain wherein the search request comprises a transaction hash that is stored in the digital wallet and seeks to return an identifier of an NFT that is associated with the transaction hash.

3. The system of claim 2, wherein the instructions to determine whether the digital wallet indicates that the requesting entity owns the first NFT further comprise instructions to:
in response to the identifier for the NFT that is associated with the transaction hash matching an identifier for the first NFT, determine that the digital wallet indicates that the requesting entity owns the first NFT.

4. The system of claim 2, wherein the instructions to determine whether the digital wallet indicates that the requesting entity owns the first NFT further comprise instructions to:
render content of the NFT that is associated with the transaction hash;
compare the rendered content to the digital content of the print request; and
in response to the rendered content corresponding to the digital content of the print request, determine that the digital wallet indicates that the requesting entity owns the first NFT.

5. The system of claim 1, wherein the instructions to generate the print job also comprise instructions to generate and cause the print engine to print a verification code with the digital content, wherein the verification code comprises an identifier for the digital wallet, a transaction hash that is stored in the digital wallet, or both.

6. The system of claim 5, wherein the set of instructions to print the digital content comprise instructions to:
print the digital content on a first side of a substrate; and
print the verification code on a second side of the substrate.

7. The system of claim 5, wherein the set of instructions to print the digital content comprise instructions to:
print the digital content as a three-dimensional object; and
print the verification code on a surface of the three-dimensional object or embed the verification code within the three-dimensional object.

8. The system of claim 1, further comprising instructions to:
prompt the requesting entity to submit a payment; and
if the user submits the payment:
generate instructions to print a verification code with the digital content, and
transfer the instructions to print the verification code to the print engine;
otherwise not generate and transfer the instructions to print the verification code.

9. The system of claim 8, further comprising additional programming instructions that are configured to instruct the processor to transmit the verification code and an identifier for the first NFT or for the digital content to a distributed digital ledger for storage.

10. The system of claim 1, further comprising:
a print device that includes the print engine, and
wherein the processor and the computer-readable medium are components of one or more of the following:
the print device, or
a computing device that is in communication with the print device.

11. The system of claim 1, wherein the instructions to generate the print job comprise instructions to extract the digital content from the first NFT and use the data to generate a queueable print system object that represents the digital content and that includes instructions for printing the digital content.

12. The system of claim 1, wherein the instructions to generate the print job comprise instructions to:
extract, from the first NFT, an address for a server;
query the server for the digital content; and
upon receipt of the digital content from the server, generate a queueable print system object that represents the digital content and that includes instructions for printing the digital content.

13. The system of claim 1, further comprising instructions to, in response to the first NFT containing a rule requiring payment of a fee for printing a verified copy of the digital content, wait to transfer the print job to the print engine until the system has received the indicia of payment.

14. The system of claim 1, further comprising:
a server;
additional programming instructions to store the print job on the server; and
additional programming instructions that are configured to cause the server to transfer the print job to an additional print engine upon presentation of an authentication credential, payment, or both from an additional requesting entity.

15. A print device, comprising:
a print engine;
a processor; and
a computer-readable medium containing programming instructions that are configured to instruct the processor to:
receive a print request from a requesting entity, wherein the print request comprises a request to print digital content that is associated with a first non-fungible token (NFT),
access a user profile of the requesting entity to identify a digital wallet that is associated with the requesting entity,
determine whether the digital wallet indicates that the requesting entity owns the first NFT,
in response to determining that the digital wallet indicates that the requesting entity owns the first NFT, generate a print job that comprises a set of instructions to print the digital content, and
after receiving indicia of payment, cause the print engine to print the digital content.

16. The print device of claim 15, wherein the instructions to determine whether the digital wallet indicates that the requesting entity owns the first NFT comprise instructions to:
submit a search request to a blockchain wherein the search request comprises a transaction hash that is stored in the digital wallet and seeks to return an identifier of an NFT that is associated with the transaction hash.

17. The print device of claim 16, wherein the instructions to determine whether the digital wallet indicates that the requesting entity owns the first NFT further comprise instructions to:
in response to the identifier for the NFT that is associated with the transaction hash matching an identifier for the first NFT, determine that the digital wallet indicates that the requesting entity owns the first NFT.

18. The print device of claim 16, wherein the instructions to determine whether the digital wallet indicates that the requesting entity owns the first NFT further comprise instructions to:
render content of the NFT that is associated with the transaction hash;
compare the rendered content to the digital content of the print request; and
in response to the rendered content corresponding to the digital content of the print request, determine that the digital wallet indicates that the requesting entity owns the first NFT.

19. The print device of claim 15, wherein the instructions to generate the print job also comprise instructions to generate and cause the print engine to print a verification code with the digital content, wherein the verification code comprises an identifier for the digital wallet, a transaction hash that is stored in the digital wallet, or both.

20. The print device of claim 19, wherein:
the print device is a three-dimensional print device; and
the instructions to print the digital content comprise instructions to:
print the digital content as a three-dimensional object; and
print the verification code on a surface of the three-dimensional object or embed the verification code within the three-dimensional object.

21. The print device of claim 15, further comprising instructions to:
prompt the requesting entity to submit a payment; and if the user submits the payment, cause the print engine to print a verification code with the digital content, otherwise not print the verification code.

22. The print device of claim 15, further comprising instructions to, in response to the first NFT containing a rule requiring payment of a fee for printing a verified copy of the digital content, wait to cause the print engine to print the print job until the system has received the indicia of payment.

23. A method for generating a secure digital copy of content associated with a non-fungible token (NFT), the method comprising, by a processor:
   receiving a print request from a requesting entity, wherein the print request comprises a request to print digital content that is associated with a first NFT;
   accessing a user profile of the requesting entity to identify a digital wallet that is associated with the requesting entity;
   determining whether the digital wallet indicates that the requesting entity owns the first NFT;
   in response to determining that the digital wallet indicates that the requesting entity owns the first NFT, generating a print job that comprises a set of instructions to print the digital content; and
   after receiving indicia of payment, causing a print engine to print the digital content.

24. The method of claim 23, wherein determining whether the digital wallet indicates that the requesting entity owns the first NFT comprises:
   submitting a search request to a blockchain wherein the search request comprises a transaction hash that is stored in the digital wallet and seeks to return an identifier of an NFT that is associated with the transaction hash.

25. The method of claim 24, wherein determining whether the digital wallet indicates that the requesting entity owns the first NFT further comprises:
   in response to the identifier for the NFT that is associated with the transaction hash matching an identifier for the first NFT, determining that the digital wallet indicates that the requesting entity owns the first NFT.

26. The method of claim 24, wherein determining whether the digital wallet indicates that the requesting entity owns the first NFT further comprises:
   rendering content of the NFT that is associated with the transaction hash;
   comparing the rendered content to the digital content of the print request; and
   in response to the rendered content corresponding to the digital content of the print request, determining that the digital wallet indicates that the requesting entity owns the first NFT.

27. The method of claim 23, wherein generating the print job also comprises generating and causing the print engine to print a verification code with the digital content, wherein the verification code comprises an identifier for the digital wallet, a transaction hash that is stored in the digital wallet, or both.

28. The method of claim 23, further comprising:
   prompting the requesting entity to submit a payment; and
   if the user submits the payment, causing the print engine to print a verification code with the digital content, otherwise not causing the print engine to print the verification code.

29. The method of claim 23, further comprising, in response to the first NFT containing a rule requiring payment of a fee for printing a verified copy of the digital content, waiting to transfer the print job to the print engine until the system has received confirmation of payment of the fee.

* * * * *